(12) United States Patent
Hongo (10) Patent No.: US 11,684,964 B2
(45) Date of Patent: Jun. 27, 2023

(54) FIXING DEVICE, FIXING METHOD, AND STRUCTURE

(71) Applicant: Takenobu Hongo, Fukushima (JP)

(72) Inventor: Takenobu Hongo, Fukushima (JP)

( * ) Notice: Subject to any disclaimer, the term of this patent is extended or adjusted under 35 U.S.C. 154(b) by 0 days.

(21) Appl. No.: 17/666,299

(22) Filed: Feb. 7, 2022

(65) Prior Publication Data

US 2022/0152684 A1 May 19, 2022

Related U.S. Application Data

(62) Division of application No. 16/963,711, filed as application No. PCT/JP2019/000298 on Jan. 9, 2019.

(30) Foreign Application Priority Data

Jan. 24, 2018 (JP) ................................. 2018-009431

(51) Int. Cl.
*B21D 39/03* (2006.01)
*B32B 3/26* (2006.01)
(Continued)

(52) U.S. Cl.
CPC ........... *B21D 39/031* (2013.01); *B21D 39/03* (2013.01); *B32B 3/263* (2013.01); *B32B 15/01* (2013.01); *B32B 37/10* (2013.01); *B21F 15/10* (2013.01)

(58) Field of Classification Search
CPC ....... B21D 39/031; B21D 39/03; B21F 15/10; B32B 15/01; B32B 3/263; B32B 37/10; B21K 25/00
See application file for complete search history.

(56) References Cited

U.S. PATENT DOCUMENTS 4,658,502 A * 4/1987 Eckold ................. B21D 39/031
29/21.1
4,897,912 A 2/1990 Slasinski
(Continued)

FOREIGN PATENT DOCUMENTS

CN 104870118 A 8/2015
DE 102009005234 A1 12/2009
(Continued)

OTHER PUBLICATIONS

English translate (DE102009005234B4), retrieved date Oct. 14, 2022.*
(Continued)

*Primary Examiner* — Shelley M Self
*Assistant Examiner* — Mohammed S. Alawadi
(74) *Attorney, Agent, or Firm* — Morrison & Foerster LLP (57) ABSTRACT

A fixing device places and layers a plurality of members between a die and a punch disposed in an opposed manner, and presses and fixes the plurality of members. The plurality of members include a first member including a first fixation portion, a second member including a second fixation portion smaller than the first fixation portion, and a third member including a third fixation portion larger than the second fixation portion. The die includes a projected portion that protrudes toward the punch, and the punch includes a sheltering portion recessed along a shape of the second fixation portion. The die and the punch press the first fixation portion and the third fixation portion, thereby forming an extruded portion and forming a recess-projection fitting structure EG in a thickness direction, so that the second fixation portion is sandwiched and fixed therebetween.

3 Claims, 6 Drawing Sheets

(51) Int. Cl.
  *B32B 15/01*   (2006.01)
  *B32B 37/10*   (2006.01)
  *B21F 15/10*   (2006.01)

(56) References Cited

U.S. PATENT DOCUMENTS

| | | | |
|---|---|---|---|
| 9,382,928 | B2 | 7/2016 | Van Niekerk et al. |
| 9,718,499 | B2 | 8/2017 | Tanaka et al. |
| 9,962,754 | B2 | 5/2018 | Hirata |
| 10,518,365 | B2 | 12/2019 | Chergui |
| 2004/0022602 | A1 | 2/2004 | Singh |
| 2008/0289169 | A1 | 11/2008 | Rapp |
| 2011/0088241 | A1 | 4/2011 | Eglinger et al. |
| 2012/0162944 | A1 | 6/2012 | Brantsch |
| 2014/0201959 | A1 | 7/2014 | Van Niekerk et al. |
| 2015/0064545 | A1 | 3/2015 | Murakami |
| 2015/0135794 | A1 | 5/2015 | Hirata |
| 2015/0336619 | A1 | 11/2015 | Tanaka et al. |
| 2016/0136717 | A1 | 5/2016 | Noe et al. |
| 2016/0227886 | A1 | 8/2016 | Van Niekerk et al. |
| 2017/0036312 | A1 | 2/2017 | Chergui |
| 2017/0254348 | A1 | 9/2017 | Ooka |

FOREIGN PATENT DOCUMENTS

| | | | | |
|---|---|---|---|---|
| DE | 102009005234 B4 | * | 8/2010 | ........... B21D 39/031 |
| JP | 2013-22628 A | | 2/2013 | |
| JP | 2015-100798 A | | 6/2015 | |

OTHER PUBLICATIONS

Hongo, U.S. Office Action dated Mar. 10, 2022, directed to U.S. Appl. No. 16/963,711; 10 pages.

International Search Report and Written Opinion dated Mar. 12, 2019, directed to PCT Application No. PCT/JP2019/000298; 18 pages.

Search Report dated Oct. 1, 2021, directed to EP Application No. 19743099.4; 4 pages.

The First Office Action dated Nov. 4, 2021, directed to CN Application No. 201980010211.4; 14 pages.

Hongo, U.S. Office Action dated Jul. 1, 2022, directed to U.S. Appl. No. 16/963,711; 10 pages.

Notification to Grant Patent Right for Invention dated Jul. 6, 2022, directed to CN Application No. 201980010211.4; 7 pages.

* cited by examiner

FIXING DEVICE, FIXING METHOD, AND STRUCTURE

CROSS-REFERENCE TO RELATED APPLICATIONS

This application is a divisional of U.S. application Ser. No. 16/963,711 filed on Jul. 21, 2020, which is a U.S. national phase patent application of International Patent Application No. PCT/JP2019/000298, filed Jan. 9, 2019, which claims priority to Japanese Patent Application No. 2018-009431, filed Jan. 24, 2018, the entire contents of each priority application of which are incorporated herein by reference.

FIELD OF THE DISCLOSURE

The present invention relates to a device for fixing members, a method for fixing members, and a structure that fixes a plurality of members (for example, metal members) by means of plastic deformation.

BACKGROUND OF THE DISCLOSURE

Examples of a method for fixing a plurality of members having different shapes, for example, a metal wire and a metal plate, include methods such as fastening with a screw, welding, and bonding.

PATENT LITERATURE

Patent Literature 1: Japanese Patent Application Laid-Open No. 2003-283154

SUMMARY OF THE DISCLOSURE

If the sizes of such metal members become minute due to the downsizing of various parts, however, their fixation becomes difficult to achieve. Considering, for example, a case where a metal wire is fixed onto a front surface of a metal plate, fastening with a screw, in which the screw directly pierces through the metal wire, cannot be employed if the width of a cross-sectional shape perpendicular to the longitudinal direction of the metal wire (in the case of a round wire having such a cross-section in a generally circular shape, its diameter) is smaller than the diameter of the screw.

In this case, a method of fastening a fixing member and the metal plate with a screw with the metal wire being sandwiched between the fixing member and the metal plate can be contemplated, for example. If the sizes of the fixing member and the metal plate that sandwich the metal wire become minute, however, a region used for fastening with a screw cannot be sufficiently reserved, thus making it difficult to achieve reliable fixation.

Also in a fixing method by means of welding or bonding, a problem of insufficient fixation strength arises if a contact area between the metal wire and the metal plate becomes minute.

In view of the foregoing circumstances, the present invention provides a device for fixing members, a method for fixing members, and a structure capable of easily achieving high fixation strength even for minute members (for example, metal members).

An aspect of the present invention provides a device for fixing members, in which a plurality of members are placed in a layered manner between a die and a punch disposed in an opposed manner, and the plurality of members are pressed and fixed by the die and the punch relatively moved so as to come closer to each other. In this device, the plurality of members include a first member including a first fixation portion, a second member including a second fixation portion smaller than the first fixation portion, and a third member including a third fixation portion larger than the second fixation portion, the die includes a projected portion that protrudes toward the punch, and the punch includes a sheltering portion recessed along a shape of the second fixation portion. The die and the punch are relatively moved so as to come closer to each other and press the first fixation portion and the third fixation portion, thereby forming an extruded portion and forming a recess-projection fitting structure in a thickness direction, so that the second fixation portion is sandwiched and fixed between the first fixation portion and the third fixation portion.

Another aspect of the present invention provides a method for fixing members, in which a plurality of members are overlapped and fixed. The method includes: a step of preparing a first member including a first fixation portion, a second member including a second fixation portion smaller than the first fixation portion, and a third member including a third fixation portion larger than the second fixation portion; a step of placing the first fixation portion, the second fixation portion, and the third fixation portion in an overlapped manner between a die and a punch disposed in an opposed manner; a step of moving the die and the punch relatively close to each other and pressing the first fixation portion and the third fixation portion forming an extruded portion and forming a recess-projection fitting structure in a thickness direction of the plurality of members, so that the second fixing portion is sandwiched and fixed by the first fixing portion and the third fixing portion.

A further aspect of the present invention provides a structure obtained by layering and integrally fixing a plurality of members. The structure includes at least a first member including a first fixation portion, a second member including a second fixation portion smaller than the first fixation portion, and a third member including a third fixation portion larger than the second fixation portion. The structure includes an extruded portion formed by overlapping, and extruding in an overlapped direction, the first fixation portion, the second fixation portion, and the third fixation portion. A recess-projection fitting structure between the first fixation portion and the third fixation portion is provided in the extruded portion, so that the second fixation portion is sandwiched and fixed between the first fixation portion and the third fixation portion.

The present invention can provide the device for fixing members, the method for fixing members, and the structure capable of easily achieving high fixation strength even for minute members (for example, metal members).

BRIEF DESCRIPTION OF THE FIGURES

FIGS. 1A-1D provides diagrams illustrating a main part of a fixing device according to an embodiment of the present invention wherein

FIGS. 2A-2B provides schematic diagrams illustrating a structure formed by the fixing device according to an embodiment of the present invention wherein

DETAILED DESCRIPTION OF THE DISCLOSURE

An embodiment of the present invention will be described below in detail with reference to the drawings. Note that the subsequent figures each omit a part of a configuration as appropriate so as to simplify the figures. Moreover, sizes, shapes, thicknesses, and the like of members are depicted in an exaggerated manner as appropriate in the subsequent figures.

Figure 1A:
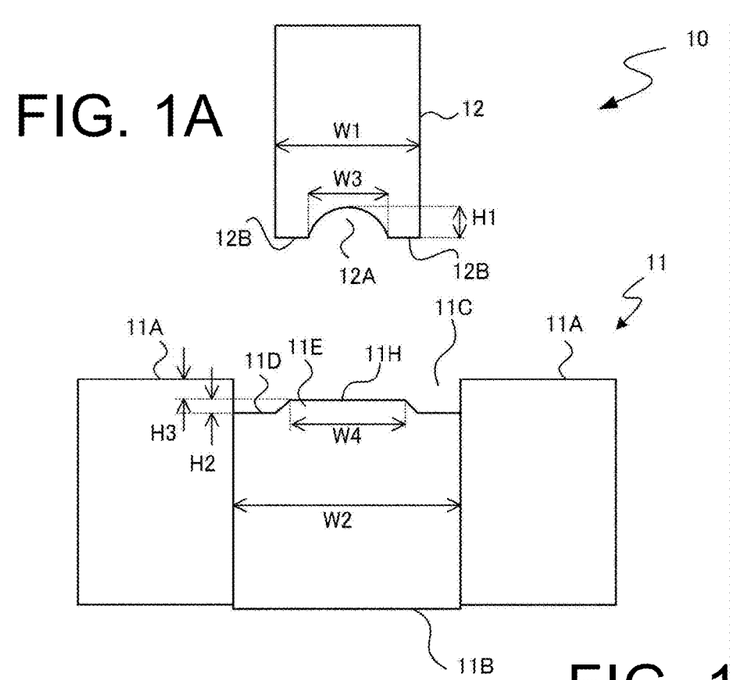
FIG. 1A is a sectional side view thereof.
Figure 1B:
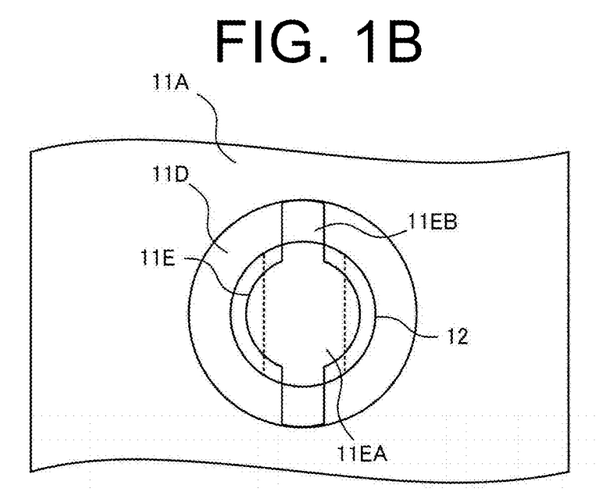
FIG. 1B is a top view thereof.
Figure 1C:
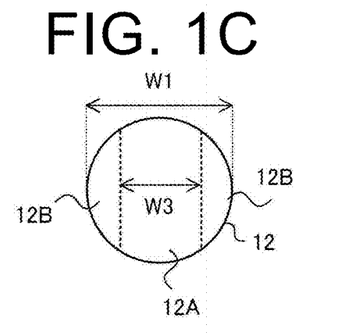
FIG. 1C is a top view of a punch.
Figure 1D:
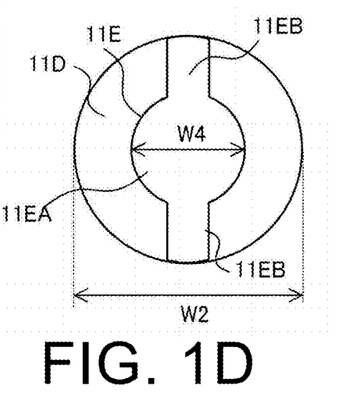
FIG. 1D is a top view of a die.

FIGS. 1A-1D provide diagrams illustrating a main part of a device 10 for fixing members according to the present embodiment. FIG. 1A is a sectional side view thereof; FIG. 1B is a top view of FIG. 1A; FIG. 1C is a top view of a punch 12 in FIG. 1B; and FIG. 1D is a top view of a die 11 in FIG. 1B.

As shown in FIGS. 1A-1D, the fixing device 10 of the present embodiment includes the die 11 and the punch 12, which are disposed in an opposed manner and capable of relatively moving so as to come closer to, and move away from, each other. The fixing device 10 places a plurality of members 13 in a layered manner between the die 11 and the punch 12, and presses and fixes the plurality of members 13 by the die 11 and the punch 12 relatively moved so as to come closer to each other.

The die 11 includes, for example, a cylindrical outer frame (stage) 11A having a hollow portion, and an inner member 11B to be inserted into the hollow portion. A recessed portion 11C is created by positioning an upper end of the inner member 11B at a level lower than the outer frame 11A. For example, the inner member 11B includes: a columnar basal portion 11D having an outer peripheral surface to be in contact with an inner peripheral surface of the outer frame 11A; and a projected portion 11E provided in a central portion of one end surface of the basal portion 11D closer to the recessed portion 11C so as to be projected toward the punch 12 along the axial direction of the outer frame 11A. The depth of the recessed portion 11C relative to the outer frame 11A is set, for example, so as to be small in its central portion where the projected portion 11E is provided and large in a generally doughnut shape in its outer edge portion (the basal portion 11D).

For example, the projected portion 11E is configured so as to have a wider width at a side closer to the basal portion 11D than at a leading end (head portion 11H) side, and surfaces (surfaces facing the punch 12) of the basal portion 11D and the head portion 11H of the projected portion 11E are each configured in a generally flat shape. The term "generally flat shape" is not limited to having strict flatness, but refers to having no projections and recesses intentionally formed in order to cause any action at the time of pressing.

As shown in FIGS. 1B and 1D, the projected portion 11E includes, for example, a base portion 11EA having a generally circular shape as viewed from above, and protruded portions 11EB protruded outwardly from the center in two locations along the outer periphery of the base portion 11EA. More specifically, the protruded portions 11EB are disposed in an opposed manner in the two locations approximately on the circumference of the base portion 11EA so as to be on an extension line of a diameter (the vertically-extending diameter in FIGS. 1B and 1D) of the base portion 11E.

Constituting the die 11 having a recessed shape by using the outer frame 11A and the inner member 11B in combination allows for changing an insertion position of the inner member 11B relative to the outer frame 11A. Thus, the depth of the recessed portion 11C can be finely adjusted. Moreover, the inner member 11B can be replaced by another inner member 11B including a projected portion 11E having different dimensions. Thus, the shape of the recessed portion 11C can be finely adjusted.

For example, the punch 12 has a columnar shape having a diameter W1 smaller than an inner diameter W2 of the recessed portion 11C. The punch 12 includes: a sheltering portion 12A recessed in a direction away from the die 11 (the inner member 11B) along the shape of a metal wire to be fixed (for example, a second member 132 in the shape of a round wire shown in FIGS. 2A-2B); and a pressing portion 12B on either side of the sheltering portion 12A. In this example, the sheltering portion 12A has a tunnel shape extending in the diameter direction of the columnar punch as shown in FIGS. 1B and 1C. The tunnel shape of the sheltering portion 12A as used herein refers to a shape constituted by a partial arc such that the circumferential distance (arc) of its curved surface (arched surface) is smaller than that of a semicircular column shape. Specifically, a width W3 of the maximum part (the widest part) of the sheltering portion 12A in a horizontal direction is smaller than the diameter of the column including the sheltering portion 12A. A height H1 of the sheltering portion 12A in a perpendicular (vertical) direction is smaller than the radius of curvature of the curved surface (arched surface).

For the projected portion 11E of the die 11, a diameter (width) W4 of the base portion 11EA is the widest in the horizontal direction perpendicular to the axial direction of the inner member 11B as shown in FIGS. 1A and 1D. The width W3 of the sheltering portion 12A is smaller than the diameter (width) W4 of the base portion 11EA as shown in FIGS. 1B to 1D.

The dimension of the outer periphery of the pressing portion 12B in the punch 12 (the diameter W1 of the punch 12) is larger than the width W4 of the widest part of the projected portion 11E (the diameter (width) of the head portion 11H). The pressing portion 12B has a generally flat shape as with the head portion 11H of the projected portion 11E. The pressing portion 12B is disposed so as to be opposed to the head portion 11H of the projected portion 11E, and these portions serve as pressing surfaces for directly pressing the members 13.

Figure 2A:
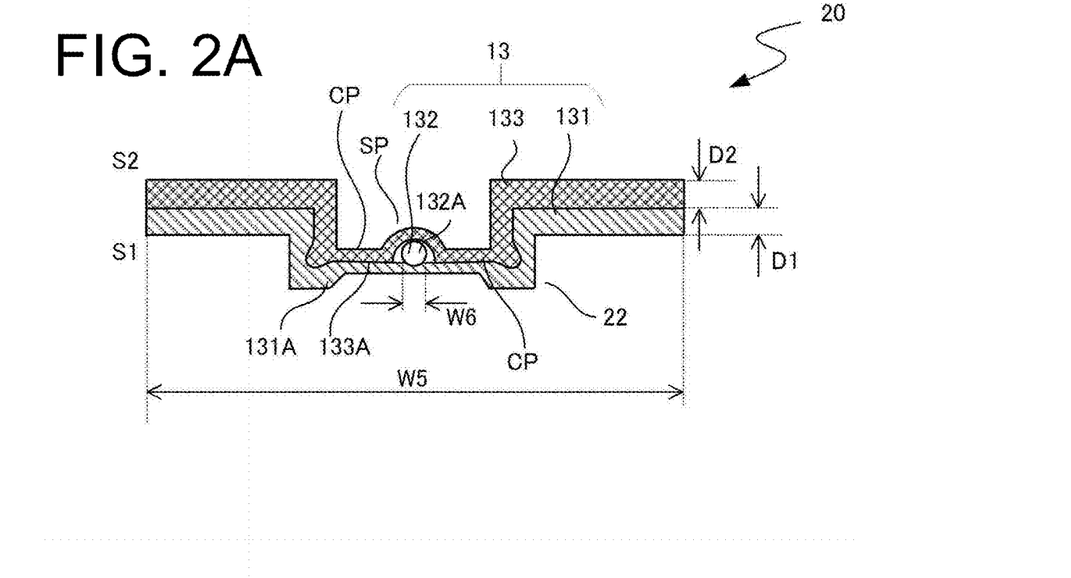
FIG. 2A is a side view thereof.
Figure 2B:
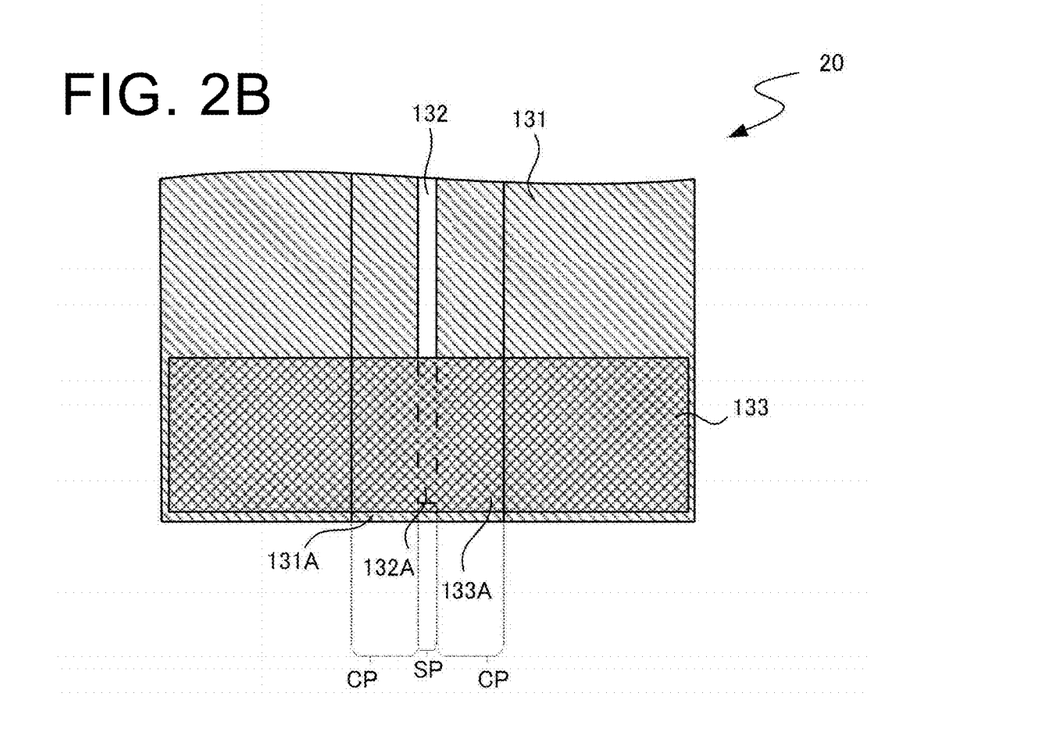
FIG. 2B is a top view thereof.

FIGS. 2A-2B provides schematic diagrams illustrating a structure 20 fixed by the fixing device 10 according to the present embodiment. FIG. 2A is a side view thereof, and FIG. 2B is a top view thereof.

As shown in FIGS. 2A-2B, the structure 20 of the present embodiment is obtained by layering and integrally fixing the plurality of members 13. The plurality of members 13 in this case include a first member 131, a second member 132, and a third member 133. By way of example, each of the first member 131, the second member 132, and the third member 133 is a metal member. The first member 131 and the second member 132 are members to be actually fixed (for example, essential components for a given part), and the third member 133 is an auxiliary member (fixing member) for fixing the first member 131 and the second member 132.

As shown in FIG. 2B, the first member 131 includes a first fixation portion 131A, the second member 132 includes a second fixation portion 132A (indicated by a two-dot chain line in FIG. 2B) smaller than the first fixation portion 131A, and the third member 133 includes a third fixation portion 133A larger than the second fixation portion 132A.

According to the fixing device 10 of the present embodiment, the first fixation portion 131A, the second fixation portion 132A, and the third fixation portion 133A are integrally fixed. More specifically, an extruded portion 22 extruded by the pressing of the first fixation portion 131A and the third fixation portion 133A is formed. In the extruded portion 22, a recess-projection fitting structure is formed in the thickness direction of the members 13, and the second fixation portion 132A is sandwiched and fixed between the first fixation portion 131A and the third fixation portion 133A.

For example, the first fixation portion 131A and the third fixation portion 133A of the present embodiment are flat plate-shaped regions, and the second fixation portion 132A is a linear region smaller than the first fixation portion 131A. For the plurality of members 13 in the present embodiment, as long as the first fixation portion 131A to the third fixation portion 133A to be pressed by the die 11 and the punch 12 have the above-described shapes, the remaining region (the region excluding the regions to be pressed) can have any shape.

By way of example, a case where the first member 131 is a minute flat plate-shaped rectangular member, the second member 132 is a linear member having a generally circular cross-section perpendicular to the longitudinal direction (the up-down direction of FIG. 2B), and the third member 133 is a flat plate-shaped rectangular member will be described here. That is, the fixing device 10 in this example fixes, for example, the second member 132 having a thin round wire shape with a diameter W6 smaller than a width W5 of the first member 131 (for example, the diameter W6 is smaller than or equal to 0.5 mm, more preferably smaller than or equal to 0.3 mm, and still more preferably smaller than or equal to 0.1 mm) to a front surface (an upper surface) of the first member 131, which is a minute flat plate-shaped rectangular member (for example, the length (width) W5 in the shorter-side direction (the right-left direction in FIGS. 2A-2B) is smaller than or equal to 1 cm, more preferably smaller than or equal to 7 mm), with the use of the flat plate-shaped third member 133. The third member 133 is a flat plate-shaped member in which at least the third fixation portion 133A can cover the second fixation portion 132A and overlap part of the first fixation portion 131A.

For example, a plate thickness D1 of the first fixation portion 131A is smaller than or equal to 0.5 mm, more preferably smaller than or equal to 0.3 mm. For example, a plate thickness D2 of the third fixation portion 133A is also smaller than or equal to 0.5 mm, more preferably smaller than or equal to 0.3 mm.

The third member 133 may have any shape capable of fixing the second member 132 to the first member 131 by its deformation. A case where the entire third member 133 serves as the third fixation portion 133A will be described here as an example. Although this example shows a case where the third member 133 is a flat plate-shaped rectangular member having an area smaller than that of the first member 131, the third member 133 may have an area equivalent to or larger than that of the first member 131 and may have any shape, such as a circular or another shape, capable of fixing the second member 132 to the first member 131 by its deformation.

The first member 131 in this example is a member disposed as a lower layer so as to be brought into contact with the die 11, the second member 132 is a member placed on the upper surface of the first member 131 so as not to be in contact with the die 11 and the punch 12, and the third member 133 is a member disposed as an upper layer for the second fixation portion 132A of the second member 132 so as to be brought into contact with the punch 12.

The first fixation portion 131A of the first member 131, the second fixation portion 132A of the second member 132, and the third fixation portion 133A of the third member 133 are layered and overlapped in this order, and extruded toward one side (the lower side in this example) of the overlapped direction (the thickness direction of the members 13) so as to have the extruded portion 22.

Specifically, the members 13 are extruded in a direction from a second surface S2 (for example, an upper surface) to a first surface S1 (for example, a lower surface) of the structure 20 so as to form the extruded portion 22.

In the extruded portion 22, the recess-projection fitting structure is formed by the first fixation portion 131A and the third fixation portion 133A in the thickness direction of the members 13.

In a bottom part of the extruded portion 22, the third fixation portion 133A protrudes from the one surface to the other surface (the second surface (the upper surface) in FIG. 2A) along the shape of the second fixation portion 132A. More specifically, the third member 133 includes: a region (fixation region SP) overlapping and interposing the second member 132; and a region (join region CP) overlapping and joining the first fixation portion 131A of the first member 131 on either side of the fixation region SP.

The third member 133 (the third fixation portion 133A) is not joined to the first fixation portion 131A in the fixation region SP but joined to the first fixation portion 131A in the join regions CP present on both sides of the fixation region SP. The second member 132 is fixed by being sandwiched between the first member 131 as the lower layer and the third member 133 as the upper layer substantially without deformation (without causing deterioration such as significant deformation or cutting).

Figure 3A:
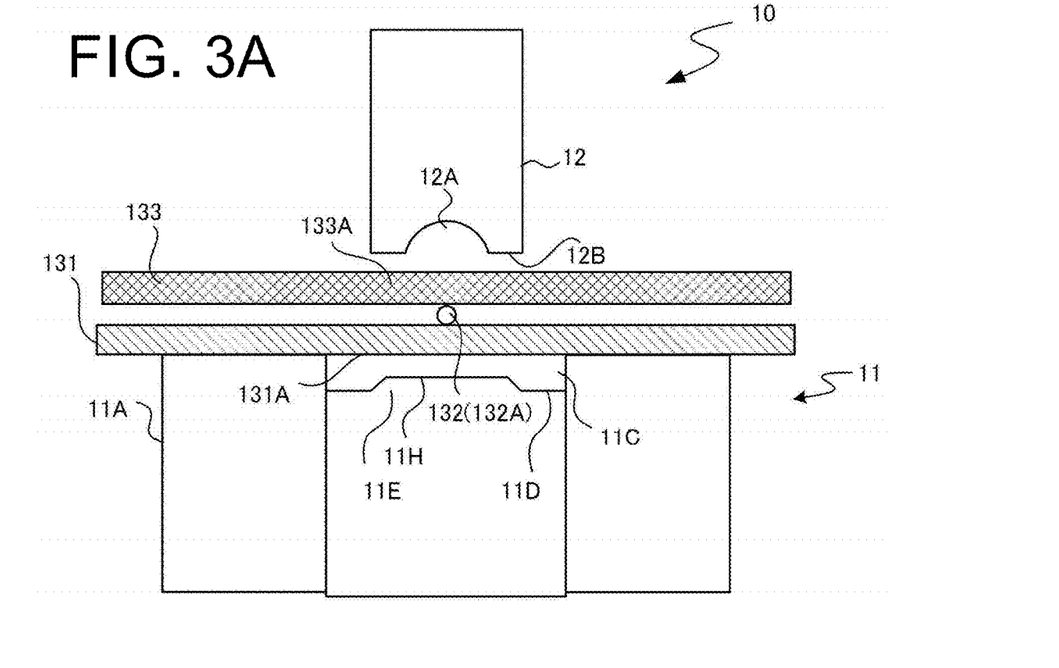
FIGS. 3A-3B is a sectional side view illustrating a fixing method by the fixing device according to an embodiment of the present invention.
Figure 3B:
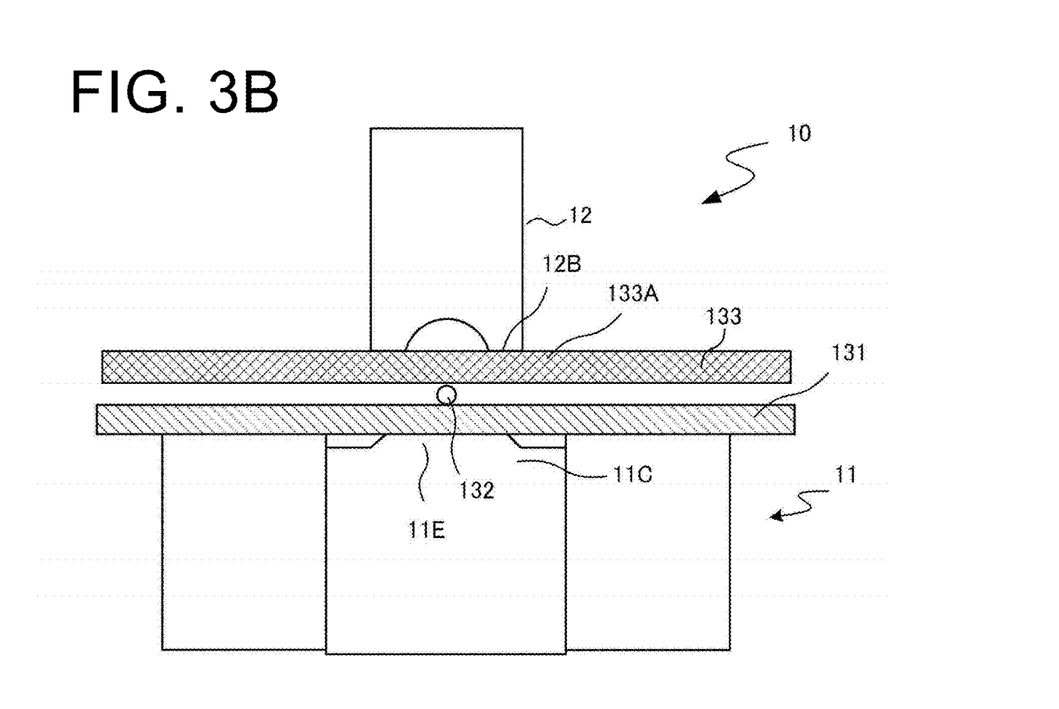
Figure 4A:
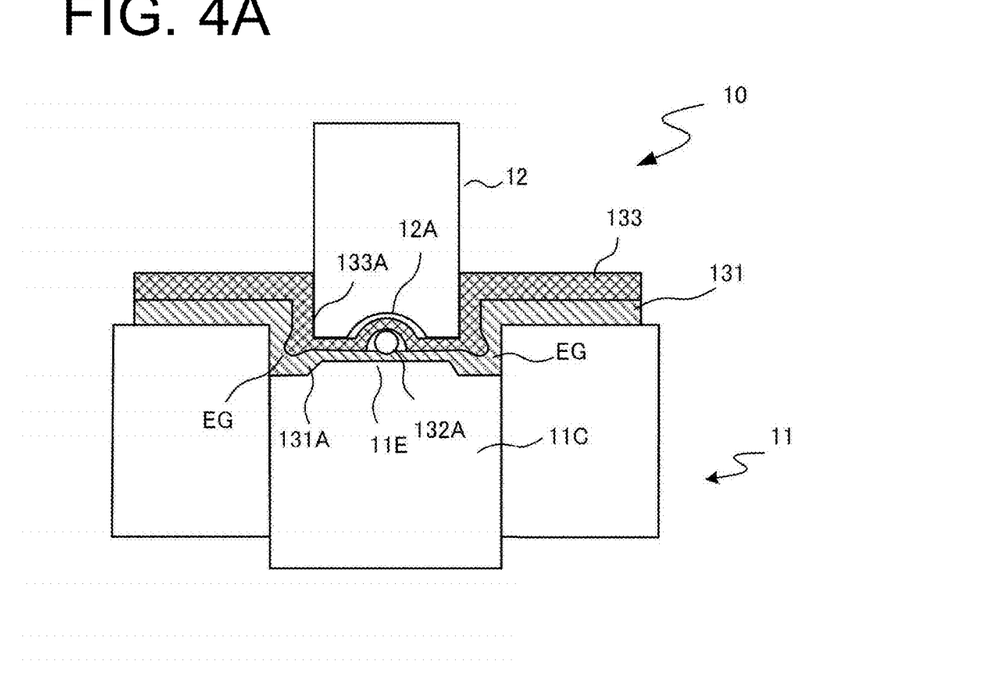
FIGS. 4A-4B is a sectional side view illustrating the fixing method by the fixing device according to the embodiment of the present invention.
Figure 4B:
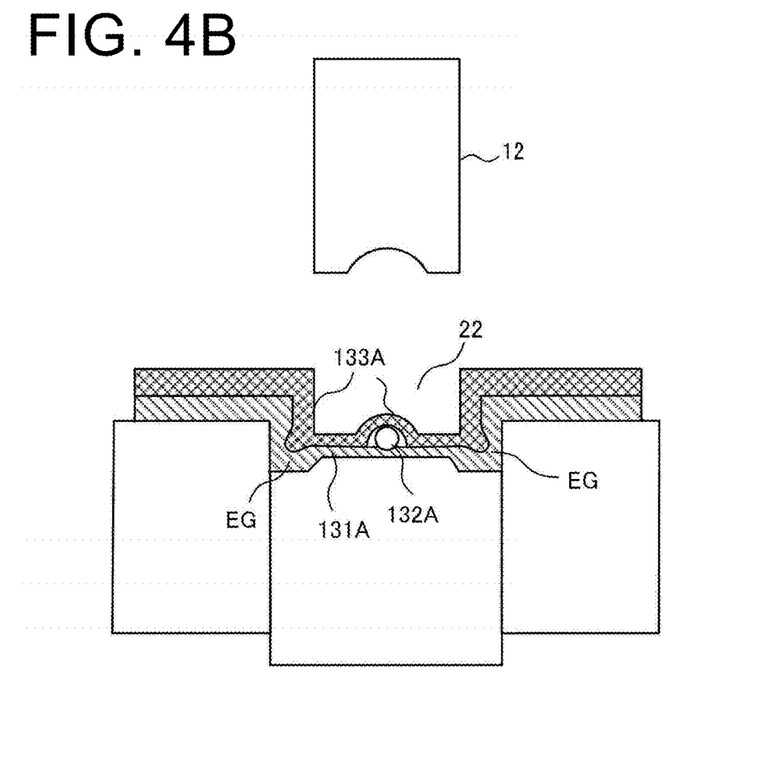

FIGS. 3 and 4 are schematic sectional side views showing, in chronological order, a fixing method using the fixing device 10 of FIG. 1.

First, the first member 131 is layered on the die 11 (specifically, the cylindrical outer frame 11A), the second member 132 is layered thereon, and the third member 133 is further layered thereon in this order so that the first fixation portion 131A, the second fixation portion 132A, and the third fixation portion 133A are positioned above the projected portion 11E as shown in FIG. 3A.

Subsequently, the die 11 and the punch 12 are relatively moved so as to come closer to each other and cause the pressing portion 12B of the punch 12 to be brought into contact with and press the third fixation portion 133A, for example, by pushing the punch 12 toward the die 11 as shown in FIG. 3B.

Consequently, the first fixation portion 131A and the third fixation portion 133A are pressed, thereby causing plastic deformation in the members 13 of these fixation portions in the press region and its surrounding region as shown in FIG. 4A.

For example, the dimensions of an inner region of the sheltering portion 12A in the fixing device 10 are as follows: the height H1 is smaller than the radius of curvature of the sheltering portion 12A, and the width W3 of the maximum part in the horizontal direction is smaller than twice the radius of curvature of the curved surface (arch) of the sheltering portion 12A.

Although the punch 12 comes into contact with and presses the third fixation portion 133A in the pressing portion 12B, a pressing force on the third fixation portion 133A in the sheltering portion 12A is significantly (extremely) smaller than a pressing force of the pressing portion 12B. That is, the third fixation portion 133A in contact with the pressing portion 12B is largely deformed by the pressing, but the third fixation portion 133A directly under the sheltering portion 12A has a significantly smaller deformation amount. Thus, the deformation of the second fixation portion 132A hardly occurs even when pressed by the punch 12. Or, even if the deformation of the second fixation portion 132A occurs, such deformation would be kept at a level not affecting the function as the second member (thin metal wire) 132. Thus, deterioration, such as deformation or cutting, which results in the failure of the function as the second member 132, is prevented from occurring.

For ease of explanation, the example of FIG. 4A shows, by way of example, a case where the sheltering portion 12A and the third fixation portion 133A are not in contact with each other, but these portions may be in contact with each other. Even when these portions are in contact with each other, the pressing force of the sheltering portion 12A is significantly smaller than the pressing force of the pressing portion 12B (the pressing force of the sheltering portion 12A is at a level hardly pressing the third fixation portion 133A).

Consequently, the extruded portion 22 extruded toward one side (the lower side in this example) of the overlapped direction of the first fixation portion 131A and the third fixation portion 133A (the thickness direction of the members 13) is formed, and a recess-projection fitting structure EG between the first member 131 and the third member 133 is formed in the thickness direction of the members 13 (the structure 20), as shown in FIG. 4B.

In the sheltering portion 12A of the punch 12, the third member 133 is plastically deformed in a tunnel shape, and the second fixation portion 132A is covered by the third fixation portion 133A plastically deformed in a tunnel shape over an area from its lateral sides to its upper side. The second fixation portion 132A is in a state of being sandwiched between the first fixation portion 131A and the third fixation portion 133A joined by the fitting structures EG. Thus, the second fixation portion 132A is fixed to the first fixation portion 131A in such a way that it is impossible, or extremely difficult, for the second fixation portion 132A to be separated from the first fixation portion 131A. At the same time, the second member is fixed to the first fixation portion 131A without being deteriorated by the sheltering portion 12A (without causing cutting or large deformation).

Figure 5:
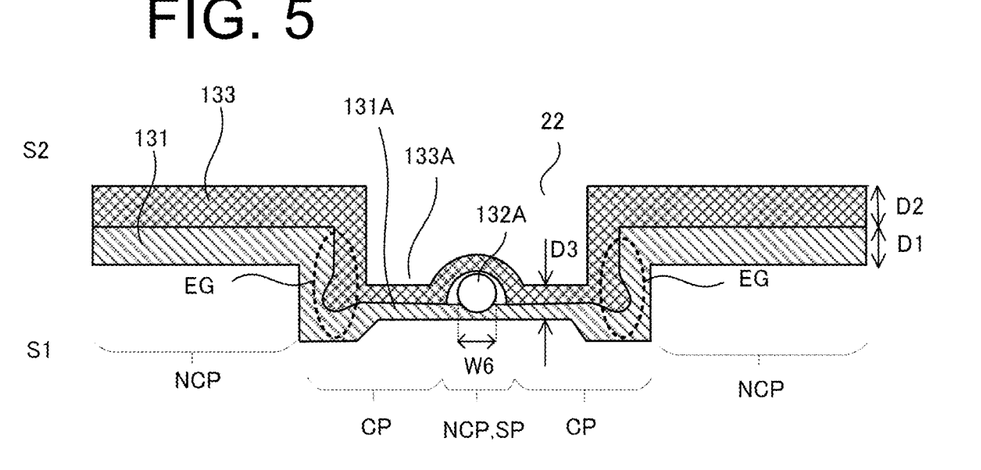
FIG. 5 is a schematic side view illustrating the structure formed by the fixing device according to the embodiment of the present invention.

The structure 20 will be further described with reference to FIG. 5. FIG. 5 is a schematic side view of the structure 20.

In the present embodiment, the first fixation portion 131A and the third fixation portion 133A in a region (press region) pressed by the projected portion 11E of the die 11 and the pressing portion 12B of the punch 12 and its surrounding region undergo plastic deformation in the members 13 of these fixation portions, thus making it impossible, or extremely difficult, for the first fixation portion 131A (the first member 131) and the third fixation portion 133A (the third member 133) to be detached (separated) from each other.

As just described, the region where plastic deformation has occurred in the members 13 in such a way that it is impossible, or extremely difficult, for the first member 131 and the third member 133 to be detached (separated) from each other is referred to as the join region CP, whereas a region where no plastic deformation of the first member 131 and the third member 133 has occurred in the vicinity of the join region CP as well as a region where the first member 131 and the third member 133 are not in contact with each other (for example, around the second fixation portion 132A) are each referred to as a non-join region NCP. Note however that the first member 131 and the third member 133 are not fixed (joined) but are still impossible (difficult) to be detached from each other also in the non-join regions NCP due to the provision of the join regions CP. Thus, the first member 131 and the third member 133 are substantially in intimate contact with each other in an inseparable manner.

Although the join region CP and the non-join region NCP are illustrated in FIG. 5 for the sake of convenience, a boundary therebetween cannot be precisely specified. In the present embodiment, at least the region where no plastic deformation of the first member 131 and the third member 133 has occurred as well as the region where the first member 131 and the third member 133 are not in contact with each other can be regarded as the non-join region NCP, and the remaining region can be regarded as the join region CP.

In the join region CP, the extruded portion 22 extruded (recessed) in a direction from the second surface S2 (for example, the upper surface) to the first surface S1 (for example, the lower surface) of the structure 20 (member 13) is formed. That is, the extruded portion 22 is formed corresponding to the press region by the die 11 and the punch 12. In the join region CP where the first member 131 and the third member 133 are in contact with each other in the extruded portion 22, its thickness D3 is also reduced. That is, the thickness D3 of the join region CP where the first member 131 and the third member 133 are in contact with each other in the extruded portion 22 is smaller than the total plate thickness (D1+D2) of the first member 131 and the third member 133 in the non-join regions NCP around the extruded portion 22.

Although a case where as the extruded portion 22, the third member 133 (the third fixation portion 133A) is extruded so as to be positioned lower than its plate thickness D2 and the first member 131 (the first fixation portion 131A) is also extruded so as to be positioned lower than its plate thickness D1 is illustrated in FIG. 5, the present invention is not limited to the extruded state as shown in the figure depending on the plate thicknesses D1 and D2 of the first member 131 and the third member 133 and a positional relationship between the outer frame 11A and the inner member 11B.

If the plate thickness of the first member 131 is sufficiently large, for example, only the third member 133 may be extruded so as to be positioned lower than its plate thickness D2, and the first member 131 may be extruded downwardly on the upper surface side (the second surface S2 side) but the first member 131 may be flat on the lower surface side (the first surface S1 side).

In the press region, i.e., around the extruded portion 22, each of the first member 131 and the third member 133 is plastically deformed by the pressing achieved by the punch 12 and the die 11 so as to be extruded outwardly, and the recess-projection fitting structures EG (indicated by broken lines) between the first member 131 and the third member 133 are formed in the thickness direction of the structure 20. The recess-projection fitting structure EG formed in the thickness direction (the up-down direction in FIG. 5) enables the first member 131 and the third member 133 to be reliably fixed (joined) together.

An approximately central part of the extruded portion 22, on the other hand, has a layered structure of the first member 131, the second member 132 in the shape of a round wire, and the third member 133, and serves as the fixation region SP of the second fixation portion 132A. Since the punch 12 is provided with the sheltering portion 12A conforming to the shape of the second member 132 as described above, the pressing force exerted directly under the sheltering portion 12A when pressed by the punch 12 is extremely smaller than the pressing force exerted directly under the pressing portion 12B, and thus the third member 133 positioned under the press region is plastically deformed in a tunnel shape. In the fixation region SP, the second member 132 (the second fixation portion 132A) is covered by the third fixation portion 133A plastically deformed in a tunnel shape over an area from its upper side, and the lower side of the second member 132 (the second fixation portion 132A) is covered by the first fixation portion 131A. Consequently, the second member 132 is prevented from being separated from the first member 131.

In the fixation region SP, the region where the first fixation portion 131A and the third fixation portion 133A are not in contact with each other is the non-join region NCP. However, the second fixation portion 132A is fixed to the first fixation portion 131A in the fixation region SP due to the provision of the join regions CP around the non-join region NCP.

With such a configuration, the first member 131 and the second member 132 can be fixed together without employing fastening with a screw, bonding, or the like. Especially when the first member 131 is a minute flat plate-shaped member and the second member 132 is a thin metal wire, especially when these members are minute, fixation with increased fixation strength is hard to achieve. According to the present embodiment, however, the second member 132 can be sandwiched and fixed between the first member 131 and the third member 133 strongly joined by the recess-projection fitting structures EG formed in the thickness direction. Thus, even minute members can be reliably fixed, and the fixation strength can be increased.

Furthermore, even when a method of fixing the second member 132 by pressing the first member 131 and the third member 133 is employed, the sandwiched second member 132 can take shelter into the sheltering portion 12A, thereby avoiding crushing (large deformation) or cutting. If the second member 132 is uncut but largely deformed in a portion sandwiched between the first member 131 and the third member 133, the deformed portion of the second member 132 may be cut with time due to a large load, such as tension or pressing force, (repeatedly) applied to the second member 132 in a region other than the sandwiched portion (the structure 20). According to the present embodiment, the second member 132 can be fixed while avoiding its deformation. Thus, even in a configuration in which a load is applied to the second member 132 in the region other than the structure 20, the cutting of the second member 132 in the vicinity of the structure 20 can be prevented from occurring.

Example 1

With the use of a minute metal member having a rectangular column shape as the first member 131 and a thin metal wire as the second member 132, fixation using the fixing device 10 of the present embodiment was performed, and the structure 20 was formed.

Figure 6:
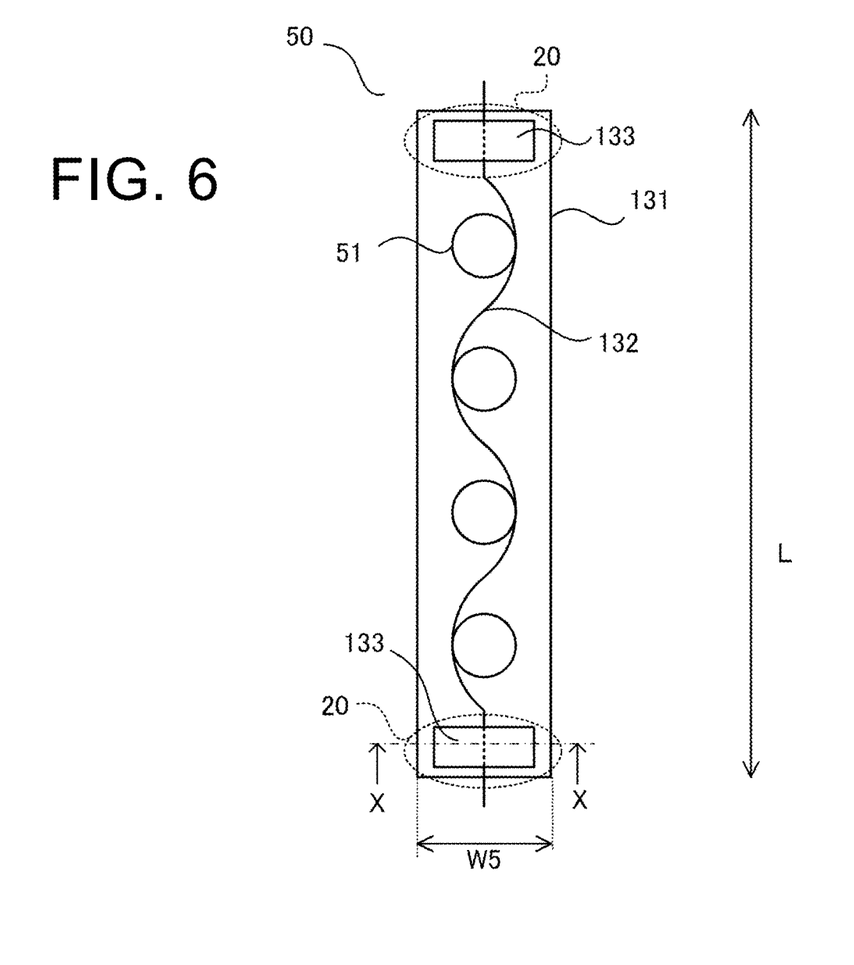
FIG. 6 is a top view illustrating a structure formed by the fixing device according to the embodiment of the present invention.

FIG. 6 is a partial top view of a part 50 including the structures 20. A cross-section taken along the line X-X in FIG. 6 corresponds to FIG. 5. The first member 131 is a plate-shaped member having a plate thickness D1 of 0.2 mm, and the second member 132 is a round wire (thin metal wire) having a diameter W6 of 0.072 mm. The third member 133 is a flat plate-shaped member having a plate thickness D2 of 0.2 mm.

In this part 50, a resonator is formed by disposing a plurality of tension rollers 51 on the front surface of the first member 131 and making the second member 132 passed through the tension rollers 51 in a zigzag manner, for example. A portion of the second member (thin metal wire) 132 passed through the tension rollers 51 in a zigzag manner is fixed to neither the tension rollers 51 nor the first member 131, but fixed to the first member 131 using the above-described fixing method of the present embodiment in regions indicated by broken-line circles at both ends of the first member 131 in the longitudinal direction thereof. In other words, the above-described structures 20 of the present embodiment are formed at both ends of the first member 131 in the longitudinal direction thereof, which are indicated by the broken-line circles.

For the fixing device 10 (see FIGS. 1A-1D), the punch 12 has a diameter W1 of 0.8 mm. The sheltering portion 12A has a tunnel shape, which is formed by part of a circular column (a diameter of 0.3 mm), and has a radius of curvature of the arch (the curved surface) of 0.15 mm. The width W3 of the maximum part of the inner region of the sheltering portion 12A is smaller than 0.3 mm and larger than the height H1. The height H1 is 0.05 mm. The inner diameter (diameter) W2 of the recessed portion 11C in the die 11 is 1 mm, the diameter (the width of the widest portion) W4 of the head portion 11H is 0.6 mm, a height H2 from the basal portion 11D to the head portion 11H is 0.1 mm, and a height H3 from the head portion 11H to the outer frame 11A is 0.12 mm.

With such a fixing device 10, the die 11 and the punch 12 were relatively moved so as to come closer to each other and press the first fixation portion 131A and the third fixation portion 133A.

Consequently, the extruded portion 22 was formed, and the recess-projection fitting structure EG between the first member 131 and the third member 133 was formed in the thickness direction of the structure 20. The plate thickness D3 (the total thickness of the first member 131 and the third member 133, see FIG. 5) of the join region CP in the extruded portion 22 was 0.15 mm, and was plastically deformed to be smaller than a total thickness (D1+D2) of 0.4 mm for the first member 131 and the third member 133 in the non-join regions NCP around the extruded portion 22. By joining the first member 131 and the third member 133 together in this manner, the second member (thin metal wire) 132 was able to be sandwiched therebetween, and the second member 132 was able to be fixed to the first member 131 without deterioration (without causing cutting or large deformation).

Example 2

Figure 7A:
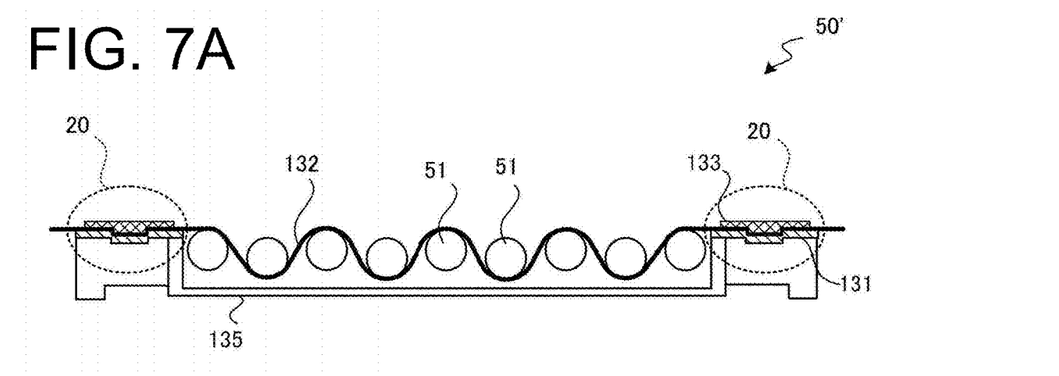
FIG. 7A is a side view illustrating a structure formed by the fixing device according to the embodiment of the present invention.
Figure 7B:
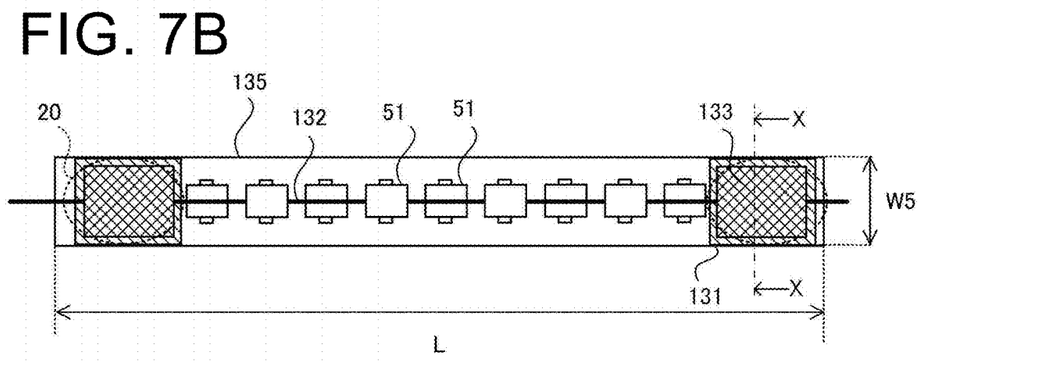
FIG. 7B is a top view thereof.

FIGS. 7A-7B are diagrams illustrating another part 50' including the structures 20. FIG. 7A is a side view thereof, and FIG. 7B is a top view thereof. A cross-section taken along the line X-X in FIG. 7B corresponds to FIG. 5. In this part 50', a resonator is formed by disposing a plurality of tension rollers 51 inside a housing 135 and making the second member 132 passed through the tension rollers 51 in a zigzag manner, for example. The first members 131 are provided at both ends of the housing 135 in the longitudinal direction thereof. A portion of the second member (thin metal wire) 132 passed through the tension rollers 51 in a zigzag manner is not fixed to the tension rollers 51, but is fixed by the first members 131 and the third members 133 using the above-described fixing method of the present embodiment in regions indicated by broken-line circles at both ends of the housing 135 in the longitudinal direction thereof. In other words, the above-described structures 20 of the present embodiment are formed at both ends (portions indicated by the broken-line circles) of the housing 135 in the longitudinal direction thereof.

The first member 131 is a plate-shaped member having a plate thickness D1 of 0.2 mm, and the second member 132 is a round wire (thin metal wire) having a diameter W6 of 0.072 mm. The third member 133 is a flat plate-shaped member having a plate thickness D2 of 0.2 mm.

For the fixing device 10 (see FIG. 1), the punch 12 has a diameter W1 of 0.8 mm The sheltering portion 12A has a tunnel shape, which is formed by part of a circular column (a diameter of 0.3 mm), and has a radius of curvature of the arch (the curved surface) of 0.15 mm. The width W3 of the maximum part of the inner region of the sheltering portion 12A is smaller than 0.3 mm and larger than the height H1. The height H1 is 0.05 mm. The inner diameter (diameter) W2 of the recessed portion 11C in the die 11 is 1 mm, the diameter (the width of the widest portion) W4 of the head portion 11H is 0.6 mm, the height H2 from the basal portion 11D to the head portion 11H is 0.1 mm, and the height H3 from the head portion 11H to the outer frame 11A is 0.12 mm.

With the thus configured fixing device 10, the die 11 and the punch 12 were relatively moved so as to come closer to each other and press the first fixation portion 131A and the third fixation portion 133A.

Consequently, the extruded portion 22 was formed, and the recess-projection fitting structure EG between the first member 131 and the third member 133 was formed in the thickness direction of the structure 20. The plate thickness D3 (the total thickness of the first member 131 and the third member 133, see FIG. 5) of the join region CP in the extruded portion 22 was 0.15 mm, and was plastically deformed to be smaller than a total thickness (D1+D2) of 0.4 mm for the first member 131 and the third member 133 in the non-join regions NCP around the extruded portion 22. As just described, the second member (thin metal wire) 132 was able to be fixed by being sandwiched between the first member 131 and the third member 133 without deterioration (without causing cutting or large deformation).

In the part 50' shown in FIGS. 7A-7B, a pressing force is repeatedly applied to the second member (thin metal wire) 132 and the tension rollers 51 from above in FIG. 7A, thereby causing vertical vibrations of the second member 132 passed through the plurality of tension rollers 51 in a zigzag manner. At the same time, since the diameter W6 of the second member 132 is minute (for example, 0.072 mm), the part 50' is generally subjected to an extremely large external load in the vicinity of the fixation portion of the second member 132 (the portion of the structure 20). In this case, if the second member 132 has large deformation, such as crushing, in the fixation portion (the portion of the structure 20), the deformed portion may rupture with time. According to the present embodiment, however, the second member 132 can be fixed without causing large deformation such as crushing. Thus, the cutting, deterioration, or the like of the second member 132 in the fixation portion (the portion of the structure 20), which may occur with time, can be prevented from occurring, thus achieving a longer life of the part 50'.

The fixing device and the fixing method of the present embodiment achieve fixation by means of pressing made by the die 11 and the punch 12, and are especially suitable for use in fixing a very thin metal wire (wire) to a minute flat metal plate. That is, the fixing device and the fixing method of the present embodiment can be used for various purposes such as for (minute) sensors, wire harnesses, and wire bonders for semiconductor elements without being limited to the above-described examples.

The aforementioned numerical values are given by way of example only. Such numerical values can be suitably selected depending on the shapes, thicknesses, materials, and the like of the first member 131, the second member 132, and the third member 133 so that the fixed state as shown in FIG. 5 can be formed, i.e., the extruded portion 22 can be formed and the recess-projection fitting structure can be formed in the thickness direction, and the second member 132 can be fixed, without deterioration, by being sandwiched between the first member 131 and the third member 133.

Although the present invention has been described above with reference to the embodiment, various modifications of the present invention are possible without being limited to the above-described embodiment.

INDUSTRIAL APPLICABILITY

The present invention can be used for fixing a metal member.

REFERENCE SIGNS LIST 10 fixing device
11 die
11A outer frame
11B inner member
11C recessed portion
11D basal portion
11E projected portion
11H head portion
12 punch
12A sheltering portion
12B pressing portion
13 member
20 structure
22 extruded portion
131 first member
131A first fixation portion
132 second member
132A second fixation portion
133 third member
133A third fixation portion

The invention claimed is:

1. A method for fixing members, in which a plurality of members are overlapped and fixed, the method comprising:
a step of preparing a first member including a first fixation portion, a second member including a second fixation portion smaller than the first fixation portion, and a third member including a third fixation portion larger than the second fixation portion;

a step of placing the first fixation portion, the second fixation portion, and the third fixation portion in an overlapped manner between a die and a punch disposed in an opposed manner;

a step of moving the die and the punch relatively close to each other and pressing the first fixation portion and the third fixation portion forming an extruded portion and forming a recess-projection fitting structure in a thickness direction of the plurality of members, so that the second fixation portion is sandwiched and fixed by the first fixation portion and the third fixation portion;

a step of layering the first fixation portion, the second fixation portion, and the third fixation portion in this order on the die including a projected portion that protrudes toward the punch; and a step of bringing the punch including a sheltering portion recessed along the shape of the second fixation portion into contact with the third fixation portion and pressing the third fixation portion.

2. The method for fixing members of claim 1, wherein the first fixation portion and the third fixation portion are each a flat plate-shaped region, and the second fixation portion is a linear region.

3. The method for fixing members of claim 1, wherein the third fixation portion protrudes toward the surface opposite to the surface sandwiching the second fixation portion along a shape of the second fixation portion.

* * * * *